United States Patent
Brown et al.

(10) Patent No.: US 10,116,535 B1
(45) Date of Patent: Oct. 30, 2018

(54) MONITORING INTERNET USAGE ON HOME NETWORKS OF PANELIST USERS USING A MEASUREMENT DEVICE

(71) Applicant: comScore, Inc., Reston, VA (US)

(72) Inventors: Michael A. Brown, Broadlands, VA (US); Yvonne Bigbee, Nokesville, VA (US); Randall McCaskill, Oak Hill, VA (US)

(73) Assignee: comScore, Inc., Westlake, OH (US)

( * ) Notice: Subject to any disclaimer, the term of this patent is extended or adjusted under 35 U.S.C. 154(b) by 256 days.

(21) Appl. No.: 15/000,590

(22) Filed: Jan. 19, 2016

Related U.S. Application Data

(60) Provisional application No. 62/105,692, filed on Jan. 20, 2015.

(51) Int. Cl.
*H04L 12/26* (2006.01)

(52) U.S. Cl.
CPC ........ *H04L 43/062* (2013.01); *H04L 43/0876* (2013.01)

(58) Field of Classification Search
CPC ... H04L 43/062; H04L 43/0876; H04L 43/06; H04L 12/2803; H04L 12/2827; H04L 41/08; H04L 41/0866
See application file for complete search history.

(56) References Cited

U.S. PATENT DOCUMENTS

| | | | | |
|---|---|---|---|---|
| 8,902,769 B1* | 12/2014 | Dehghan | ................. | H04L 12/26 370/252 |
| 2004/0049714 A1* | 3/2004 | Marples | .............. | H04L 12/2803 714/43 |
| 2007/0022193 A1* | 1/2007 | Iwamura | ............. | H04L 12/2832 709/224 |
| 2009/0100492 A1* | 4/2009 | Hicks, III | ........... | H04L 12/2825 725/127 |
| 2013/0326047 A1* | 12/2013 | Easty | ................. | H04L 41/5019 709/224 |

* cited by examiner

*Primary Examiner* — Vivek Srivastava
*Assistant Examiner* — Todd L Barker
(74) *Attorney, Agent, or Firm* — Baker & Hostetler LLP

(57) ABSTRACT

The present disclosure relates generally to monitoring internet usage on home networks of panelist users. One example method includes, after receiving informed consent from a user, identifying the user's home network including one or more devices and a gateway configured to receive network traffic from the devices and send the received network traffic to an external network; configuring the home network to send network traffic from the devices to a measurement device connected to the gateway; and after configuring the home network, monitoring, at the measurement device, network traffic received from the devices on the home network.

23 Claims, 8 Drawing Sheets

MONITORING INTERNET USAGE ON HOME NETWORKS OF PANELIST USERS USING A MEASUREMENT DEVICE

CROSS-REFERENCE TO RELATED APPLICATION

This application claims the benefit of U.S. Provisional Application No. 62/105,692, filed Jan. 20, 2015, the contents of which are incorporated by reference herein.

BACKGROUND

Internet audience measurement may be useful for a number of reasons. For example, some organizations may want to be able to make claims about the size and growth of their audiences or technologies, such as, for example, to entice advertisers to buy advertising space in their presented content. Similarly, understanding consumer behavior, such as how consumers interact with a particular web site or group of web sites, may help organizations make decisions that improve their traffic flow or advance other objectives.

SUMMARY

In general, systems, components, methods, and techniques for monitoring internet usage on home networks of panelist users using a measurement device are provided.

In one aspect, a computer implemented method includes identifying a home network including one or more devices and a gateway configured to receive network traffic from the devices and send the received network traffic to an external network; configuring the home network to send network traffic from the devices to a measurement device connected to the gateway; and after configuring the home network, monitoring, at the measurement device, network traffic received from the devices on the home network.

Implementations of any of the described techniques may include a method or process, an apparatus, a device, a machine, a system, or instructions stored on a computer-readable storage device. The details of one or more particular implementations are set forth in the accompanying drawings and description below. Other features will be apparent from the following description, including the drawings, and the claims.

DETAILED DESCRIPTION

Figure 1:
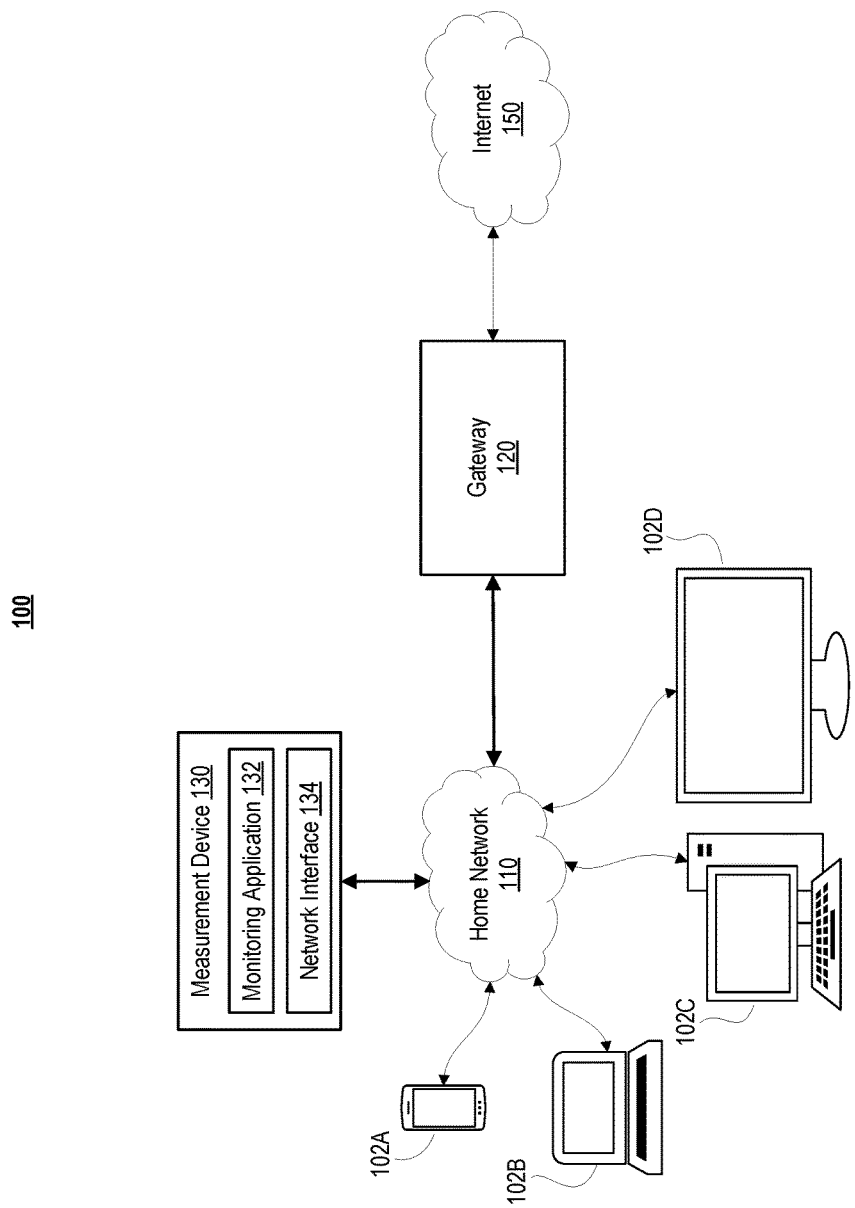
FIG. 1 illustrates an example of a system for monitoring network traffic on a home network by a measurement device connected to a gateway device.

Internet usage data, such as requests from clients to retrieve web pages, images, or other content, can be used by websites, advertisers, and others to determine characteristics and behaviors of the audience viewing their respective offerings. For example, an advertiser may use data relating to the age distribution of their audience to more specifically tailor a particular advertisement to appeal to a larger percentage of the audience. In some cases, these audience characteristics may be calculated by observing the Internet usage activity of a statistically significant number of users that are representative of the population as a whole. These "panelist" users may provide information about themselves, such as their age, income, sex, or other information, and may agree to have their Internet usage monitored. By observing the network usage of the panelists and determining characteristics and behaviors for them, characteristics and behaviors for larger portions of the audience can be inferred (within a certain margin of error based on the size of the panel relative to the size of the portion of the audience).

In some cases, a panelist may have a private home network, such as a Wi-Fi or other network, with multiple computing devices connected to it. For example, panelists who connect the measurement device to the router for their home network may use the Internet from multiple computing devices connected to the home network, such as, for example, smartphones, desktop computers, smart televisions, video-on-demand components, or other devices.

Various techniques may be employed for monitoring internet usage on home networks of panelist users. For example, an offer may be presented to a user to modify their home network to monitor network traffic generated by connected devices. If the user accepts the offer (and thereby becomes a consenting panelist), a measurement device operable to monitor network traffic on the user's home network may be provided to the user. The user may then connect the measurement device to a gateway device on the home network. The gateway device receives network traffic from devices connected to the home network and communicates with an external network on behalf of the devices. The measurement device may be communicatively coupled to the gateway device by way of hardwired Ethernet or wireless connections.

Upon detecting that it has been connected to the gateway device, the measurement device may then automatically configure the home network to send network traffic from the devices to the measurement device connected to the gateway. As described below, the measurement device may perform this configuration automatically, such that the user does not have to perform manual configuration steps to enable the measurement device to monitor traffic. Once the automatic configuration is complete, the measurement device may monitor network traffic received from the devices on the user's home network.

Some or all of the techniques described may provide one or more advantages. For instance, a measurement device that automatically interfaces with the gateway and configures the home network may offer a "plug-and-play" configuration process including minimal setup after unboxing and connecting to the gateway. Further, the network configuration techniques employed by the measurement device may allow the device to monitor network traffic on the home network without manual alteration of the configuration of the gateway device or of the devices on the home network. The measurement device may also communicate with additional measurement devices in the user's home (e.g., over a network separate from the home network), allowing it to function as a central location for collecting measurement data. These devices may allow for the collection of other types of information, such as, for example, indications of user attitude, or passive behavioral information. The present techniques may also allow for monitoring of computing devices on which a monitoring application cannot be installed (e.g., smart televisions, smart appliances, etc.), thereby allowing a wider range of Internet usage data to be monitored. In addition, the present techniques may allow a consistent monitoring and analysis methodology to be applied to network activity from devices on the home network, and may eliminate the need to develop and maintain different applications and methodologies for different types of devices on the home network.

FIG. 1 illustrates an example of a system 100 for monitoring network traffic on a home network by a measurement device connected to a gateway device. The system 100 includes a home network 110, to which a number of computing devices are connected, including devices 102A-D. Device 102A-D may include smart phones, desktop computers, smart televisions, and other client devices. A gateway device 120 is connected to the home network 110 and to the Internet 150. In some cases, additional devices may be connected between the gateway device 120 and the Internet 150. For example, the gateway device 120 may be a wireless router providing a wireless network for use by devices 102A-D. In such a case, the gateway device 120 may access the Internet 150 through another device that is connected to the Internet 150, such as a cable modem, another router, or other devices.

In operation, the measurement device 130 may monitor network traffic generated by the devices 102A-D by reconfiguring the home network 110 (including components connected to the home network 110) such that generated network traffic is routed through the measurement device 130. For example, the measurement device 130 may repeatedly send requests for network addresses (e.g., using Dynamic Host Control Protocol (DHCP), as described below) over the home network 110, prompting the gateway device 120 to respond with an available network address. The measurement device 130 may continue to send such requests until the gateway device 120 stops responding, thereby indicating that its pool of network addresses is occupied and that it will no longer respond to similar requests from other devices on the home network 110. The measurement device 130 may then respond to future requests (such as from the device 102A-D) for network addresses with responses designating itself as the "default gateway," thereby causing devices on the home network to send network traffic destined for the Internet 150 to the measurement device 130. Other techniques for effecting this configuration change (e.g., modifying the Address Resolution Protocol (ARP) table) are described below. The measurement device 130 may then monitor network traffic on the home network 110 destined for the Internet 150, and log such network traffic for later analysis or transfer to an external server connected to the Internet 150 (not shown). The measurement device 130 may also forward or "hairpin" the received network traffic to the gateway device 120 to be sent to the Internet 150.

The system 100 includes the home network 110. In some implementations, the home network 110 may be a wireless network generated by a network component, such as the gateway device 120. Such a wireless network may utilize any standard wireless networking technology, including 802.11a, 802.11b, 802.11g, 802.11n, Bluetooth, LTE, WiMAX, CDMA or any other wireless networking technology. In such implementations, the wireless network may be a public network in the sense that any device within range may connect to the network. Even though any device within range may connect to the home network 110 in such configurations, the device still may be required to authenticate in order to access resources on the home network 110 and/or on the Internet 150. The home network 110 may also be a wired network, such as an Ethernet network. In some cases, the home network 110 may utilize one or more network protocols for communication, including, but not limited to, Transmission Control Protocol (TCP), Universal Datagram Protocol (UDP), Internet Protocol (IP), or other protocols or combinations of protocols.

Devices 102A-D are connected to the home network 110. The devices 102A-D may be computing devices not all being used by the user simultaneously, but which may be being used by other users. As shown, the other devices 102A-D may include smart phones (102A), laptop computers (102B), desktop computers (102C), smart televisions (102D), and may also include other types of computing devices connected to the home network 110. The devices 102A-D may execute web browser software operable to retrieve data from the Internet 150, and may present the data to the user using an integrated or external display device, such as a monitor. The devices 102A-D may also execute other software applications operable to retrieve data from the Internet 150, such as, for example, video streaming or downloading software, music streaming or downloading software, cloud storage client software, or other applications. The devices 102A-D may also receive input from the user via one or more input devices, such as a mouse, a keyboard, a remote control, a touchscreen, or other devices.

The system 100 also includes the gateway device 120. In some cases, the gateway device 120 may be a network component operable to receive network traffic from the home network 110 and forward the traffic to the Internet 150. For example, the gateway device 120 may be a proxy server operable to receive Hypertext Transfer Protocol (HTTP) requests from the home network 110, send the HTTP requests to the appropriate locations on the Internet 150, receive responses to the HTTP requests, and provide the received responses to the requesting device. In some implementations, the gateway device 120 may be a server or set of servers connected to the home network 110. The gateway device 120 may be a firewall or other network filtering component operable to examine network traffic from the home network 110 directed to the Internet 150, and selectively block some of the traffic based on configured rules. The gateway device 120 may also be a router operable to direct network traffic received from the home network 110 to destinations on the Internet 150 according to preconfigured rules.

In some cases, the gateway device 120 may be a wireless router. In such a case, the home network 110 may be a wireless network (e.g., an 802.11a, 802.11b, 802.11n, BLUETOOTH, or other type of network) created and managed by the gateway device 120, and the devices 102A-D may communicate data to and receive data from the gateway device 120 wirelessly. In some cases, the gateway device 120 may be operable to monitor all or a portion of the network traffic on the home network 110 including different network protocols including, but not limited to, HTTP, File Transfer Protocol (FTP), Transmission Control Protocol (TCP), Universal Datagram Protocol (UDP), Internet Protocol (IP), or other protocols.

The example system 100 includes the measurement device 130. In some cases, the measurement device 130 may be an independent device operable to monitor network traffic received from devices on the home network 110. In some examples, the measurement device 130 is a computing device including an input module, data storage, one or more processors, one or more input/output devices, and memory. For example, the measurement device 130 may be a server, a router, a retrofit module for the gateway 120 (e.g., a module that is installed in or connected to the gateway to alter its functionality), or other computing device. The measurement device 130 may communicate with the gateway device 120 through network interface 134. For instance, the measurement device 130 may be connected to gateway 120 through an Ethernet link. The measurement device 130 may also be a small device or "dongle" plugged directly into an Ethernet port of gateway 120. In some implementations, the measurement device 130 wirelessly connects with the gateway 120 through network interface 134. After initially being communicatively coupled with the gateway 120, for example, by a physical installation performed by the user, the measurement device 130 may use network interface 134 to communicate with the gateway device 120 so that it may identify the home network 110 including the gateway device 120 and client devices 102A-D. The measurement device 130 may interact with the gateway device 120 to configure the home network to send network traffic from devices 102A-D to the measurement device. For example, the measurement device 130 may provide network configuration parameters to devices 102A-D of home network 110 under dynamic host configuration protocol (DHCP) instead of the gateway 120. As described below, the measurement device 130 may occupy the network addresses managed by the gateway device 120, allowing the measurement device 130 to provide network configuration to devices 102A-D of the home network 110. In some cases, the provided network configuration may designate the measurement device 130 as the "default gateway" used by devices 102A-D to send network traffic to the Internet 150. The measurement device 130 may monitor and log received network traffic received from the user devices 102A-102D, and the received network traffic to the gateway device 120, which, in turn, routes the traffic to the Internet 150.

In some cases, prior to installing the measurement device 130 on the home network 110, the user may have visited an offer website, which presented the user with an offer to monitor network traffic on the home network 110 and description of the monitoring to be performed by the measurement device 130. In some cases, this offer may be presented in the form of a webpage, and may indicate that following acceptance of the offer, measurement device 130 will be provided to the user for installation in home network 110, which will result in network traffic from the home network 110 to the Internet 150 being monitored. If the user accepted this offer, such as by clicking an "accept" button on the webpage, the offer website may arrange for the user to be provided with measurement device 130 (e.g. by placing a delivery order, coordinating a user pick-up, and the like). Upon providing informed consent to the network traffic monitoring to be performed by the measurement device 130, the user may be accepted as a panelist and be provided with the measurement device 130 for installation on their home network 110. In some cases, the measurement device 130 may provide a supplemental benefit to the user when installed, such as, for example, by creating a power line network to which other devices can be connected and providing a bridge between that network and the home network 110 and the Internet 150. In some cases, new devices on the home network 110 may be presented with an indication that their traffic is subject to monitoring by the measurement device 130 in order to inform guests on the home network 110 of the configuration.

The measurement device 130 also includes a monitoring application 132 for monitoring network traffic. In operation, the monitoring application 132 monitors network traffic received by the measurement device 130, including, for example, requests received from the home network 110, and responses to the requests received from the Internet 150. In some implementations, the monitoring application 132 may be a software application executed by one or more processors of the measurement device 130 to perform these operations. In some cases, the monitoring application 132 may be a software application including instructions specified according to one or more programming languages including, but not limited to, C, C++, Java, Python, Perl, assembly language, or other programming languages. The monitoring application 132 may also include an interpreter other environment configured to execute programming language instructions, such as a Java virtual machine or a Python interpreter.

In some cases, the monitoring application 132 may be presented with network traffic received by the measurement device 130. The monitoring application 132 may create a record of the received traffic, such as, for example, by storing the received messages comprising the network traffic to a memory of the measurement device 130 (not shown). In some implementations, the monitoring application 132 may only store a portion of the received messages (e.g., only certain information from or about each message, such as a URL, a time that the message was received, etc.), or may only store certain messages (e.g., only certain message types such as "HTTP GET"). The monitoring application 132 may determine which messages or message portions to store based on logic included in the application, or based on a set of rules identifying criteria of messages to store.

The monitoring application 132 may be operable to send the stored network traffic to an external computing device (not shown) connected to the Internet 150 or the home network 110 for further analysis. For example, the monitoring application 132 may store received network traffic in a memory until it reaches a certain size or passes a certain size threshold, at which point the monitoring application 132 may transfer the stored network traffic to the external computing device. In some cases, the monitoring application 132 may transfer the stored network traffic to the external computing device at regular intervals, such as every hour or every day. In some implementations, the monitoring application 132 may not store the received network traffic in memory, and may send the network traffic to the external computing device upon identifying that the traffic should be monitored (e.g., based on the set of rules). In some cases, the external computing device may be a server or set of servers connected to the Internet 150 operable to receive the network traffic from the measurement device 130. The external computing device may be managed by the entity providing the measurement device 130 to the user.

In some implementations, the measurement device 130 may configure the home network 110 by providing the gateway device 120 with a particular message or set of messages to redirect network traffic information from the devices 102A-D. In some implementations, the measurement device 130 may determine a message or set of message to send to the gateway device 120 in order to reconfigure the home network 110. The messages to send may be determined based on a trial-and-error configuration process or based on feedback provided to the measurement device 130 by any of devices 102A-D or gateway device 120 on the home network 110 in response to such messages. For example, the measurement device 130 may send repeated DHCP requests to the gateway device 120 until it occupies a block of addresses managed by the gateway device 120. In some cases, the measurement device 130 may include different media access control (MAC) addresses in the repeated DHCP requests. In some cases, the MAC addresses may be virtual MAC addresses (e.g., "x2-xx-xx-xx-xx-xx") reserved for locally administered use. Such addresses may be used to reduce the chance of conflicting with the MAC addresses of other computing devices on the home network 110. In some implementations, the MAC addresses sent in the repeated DHCP requests may be allocated from a range of MAC addresses associated with the measurement device 130. In some cases, measurement device 130 may continue sending requests until it stops receiving responses from the gateway device 120 (indicating that all of its network addresses are occupied), or until it reaches a threshold of requests (indicating that the reconfiguration attempt was unsuccessful). In some implementations, the measurement device 130 may modify an ARP table managed by the gateway device 120. For example, the ARP table may be modified to designate the media access control (MAC) address of the measurement device 130 as the destination for network traffic on the home network 110 (e.g., the "default gateway"). In some cases, the measurement device 130 may interact with other components on the home network 110, such as routers, switches, hubs, client devices, or other components, to reconfigure the home network 110 to send network traffic to the measurement device 130.

In some cases, the measurement device 130 may act as a proxy, and may retrieve resources from the Internet 150 on behalf of the device 102A-D. In such a case, the measurement device 130 may monitor both the requests from the device 102A-D, and the responses to those requests, which it provides to the requesting device 102A-D upon receipt. In some cases, the proxy functionality may be implemented in software as part of the monitoring application 132, or may be implemented in an additional integrated hardware component of the measurement device 130.

In some implementations, the measurement device 130 may monitor secure network traffic between the devices 102A-D and the Internet 150 by issuing certificates to the devices 102A-D and acting as a proxy as described above. As described above, the consent of the owner of the home network 110 may be obtained before performing this or any other type of monitoring.

Figure 2:
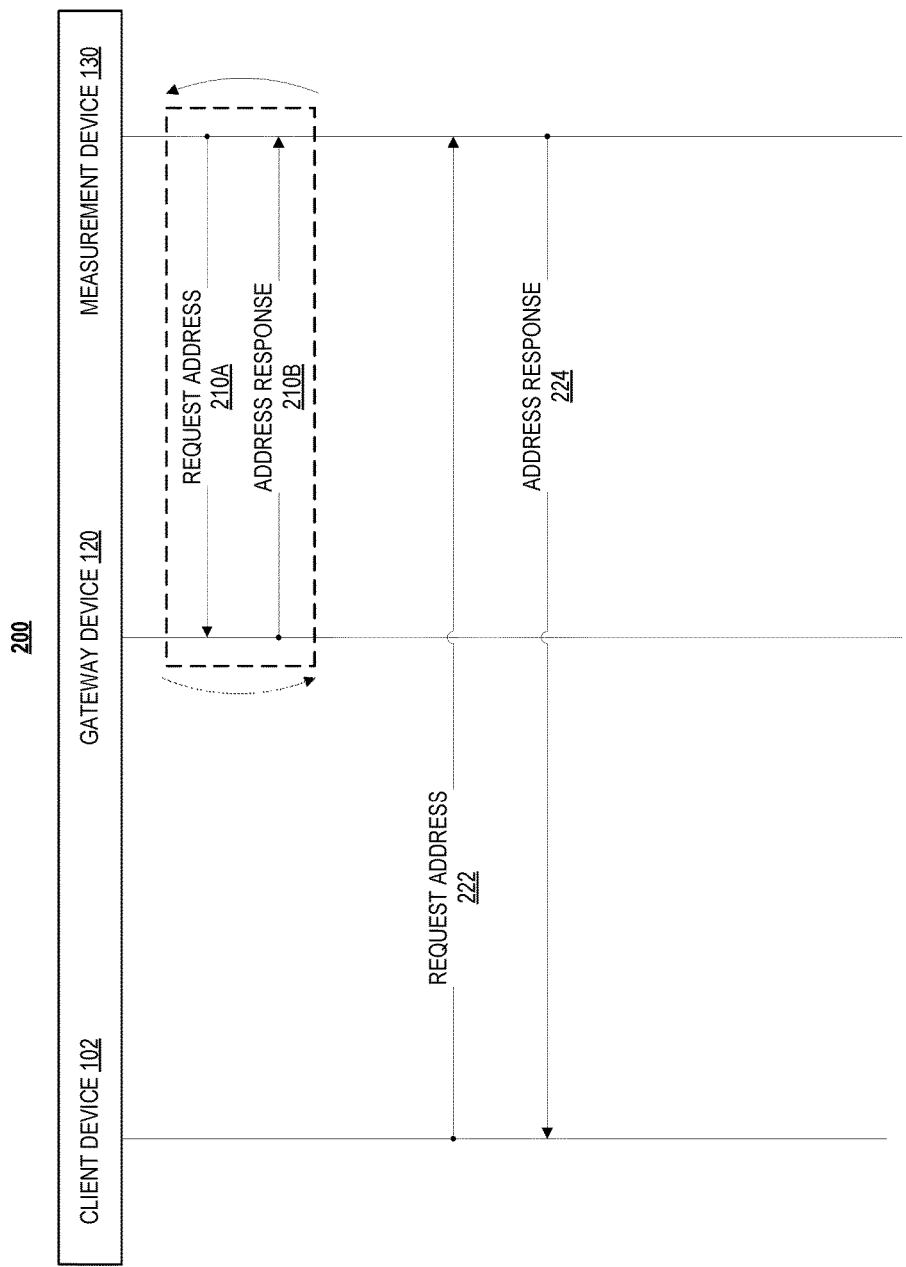
FIG. 2 illustrates an example of a sequence in which a measurement device configures a home network to send network traffic from devices on the home network to the measurement device.

FIG. 2 illustrates an example of a sequence 200 in which the measurement device 130 configures the home network 110 to send network traffic from devices on the home network 110 (e.g., 102A-D) to the measurement device 130, as described above. At 210A, the measurement device 130 sends a DHCP discovery request to the gateway device 120. At 210B, the gateway device 120 may respond to the request with an address (e.g., an IP address) allocated for the measurement device 130. As mentioned above, the measurement device 130 may continue to request addresses (210A) from the gateway device 120 until it has occupied all of the network addresses managed by the gateway device 120. In some implementations, the measurement device 130 may determine that it has occupied all of the network addresses managed by the gateway device 120 upon not receiving the address response (210B). For example, the number of requests sent by the measurement device 130 may be equal to a number of available network address leases the gateway device 120 is configured to allocate on the home network 110. In some implementations, the DHCP communication process 210A-B may occur continuously or periodically throughout the execution of sequence 200 or for an entirety of a time at which the measurement device 130 is communicatively connected to the gateway device 120.

By occupying all network address leases of the gateway device 120 as described above, the measurement device 130 may perform one or more allocation tasks under DHCP for the devices 102A-D of the home network 110. Because the gateway device 120 will no longer respond to DHCP requests, the measurement device 130 may respond to such requests, such as requests broadcasted by client device 102. In some implementations, devices connected to the home network 110 send broadcast DHCP discovery messages after the measurement device 130 occupies all of the DHCP leases of the gateway device 120 at 210A-B. The devices may send DHCP discovery messages, for example, when their associated DHCP network address leases expire (e.g., after a certain amount of time associated with each lease).

The gateway device 120 continues to enable communication between the measurement device 130 and client device 102, even though it does not respond to DHCP discovery messages sent by the client device 102 (222) (e.g., because it does not have a network address lease available for the client device 102). In response to a receiving a DHCP discovery message (222), the measurement device 130 responds to the client device 102 with an address allocated by the measurement device 130 by including the address in DHCP response (224). The measurement device 130 may also include its own network address in a "default gateway" field of the DHCP response in order to instruct the client device 102 to send network traffic directed to the Internet 150 to the measurement device 130. This configuration allows the measurement device to monitor the network traffic from the client device 102 as previously described above. Communications 222 and 224 may be routed through gateway device 120, which continues to perform the tasks of routing traffic between the home network 110 and the Internet 150.

In some implementations, such as the case described above where the measurement device 130 consumes a portion of the addresses managed by the gateway device 120, the measurement device 130 and the gateway device 120 may both continue to respond to DHCP requests, such as the request sent by the client device 102 at 222. In such a case, the measurement device 130 may monitor the home network 110 for an acceptance message sent from the client device 102 after providing the address response at 224. If the acceptance message indicates that the client device 102 has accepted an address other than the address provided by the measurement device 130 at 224, the measurement device 130 determines that the gateway device 120 or another device has provided the client device 102 with an address. In response, the measurement device 130 may send a DHCP negative acknowledgement (NACK) the client device 102 to instruct it not to use the provided address. Receipt of this message may cause the client device 102 to request a new address and allow the measurement device 130 an additional chance to respond with an address. In some implementations, the measurement device 130 may send this DHCP NACK to the client device 102 along with a new address, so as to ensure client device 102 accepts an address of the measurement device 120 upon receiving and reacting to the NACK.

In some implementations, processes similar to those of 210-224 operate to modify an ARP table managed by the gateway device 120 to designate the MAC address of the measurement device 130 as the destination for network traffic on the home network 110 (e.g. default gateway). For example, the measurement device 130 may send one or more ARP messages to instruct the gateway device 120 to associate the MAC address of the measurement device 130 with an IP address of that of a default gateway for the home network 110. Network traffic from the client device 102 destined from the Internet 150, as well as other devices included on home network 110, may then be routed by the gateway device 120 to the measurement device 130 according to the modified ARP table.

Figure 3:
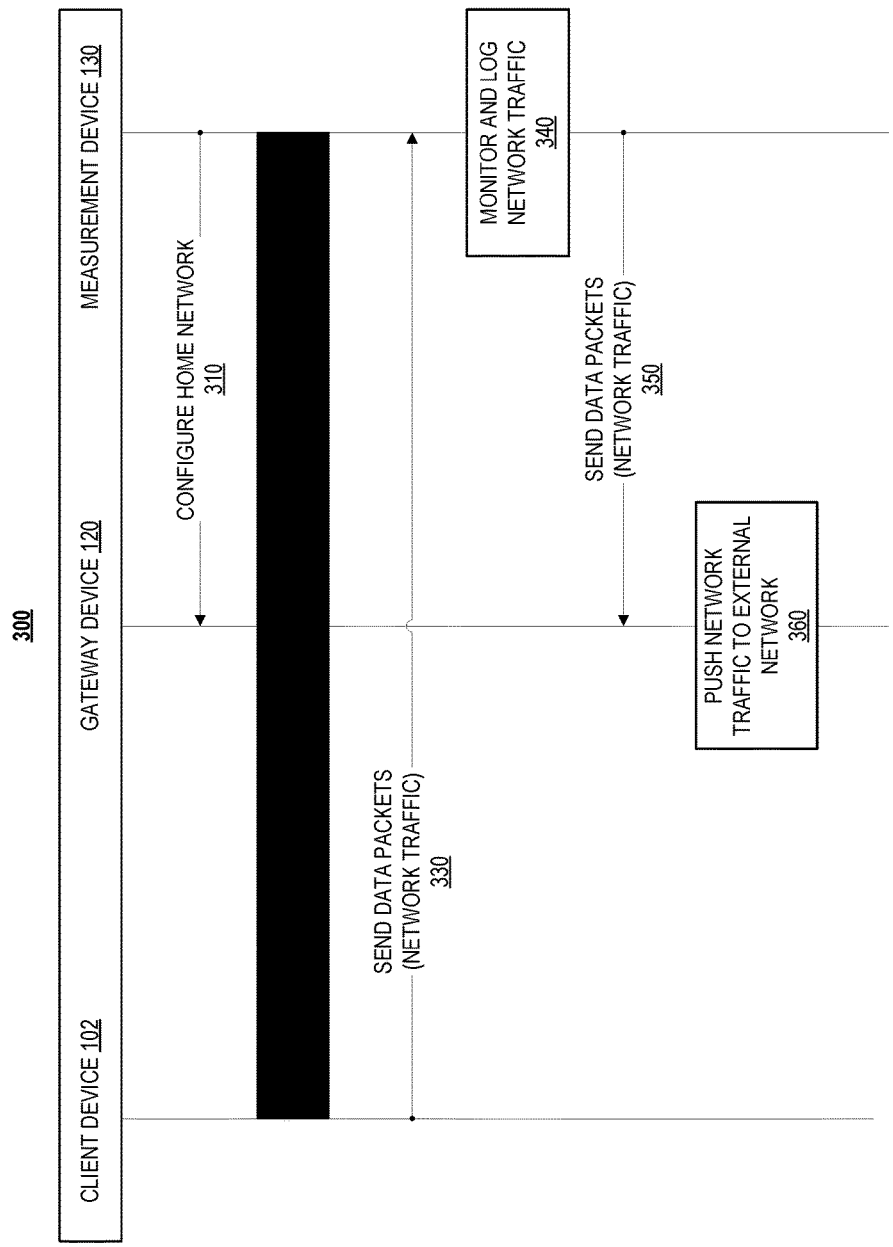
FIG. 3 illustrates an example of a sequence in which a measurement device receives network traffic from a client device after configuring the home network.

FIG. 3 illustrates an example of a sequence 300 in which the measurement device 130 configures the home network 110 and subsequently performs monitoring processes on network traffic. At 310, the measurement device 130 sends a message or set of messages to the gateway device 120 in order to configure the home network 110 accordingly. At 320, the measurement device 130 establishes communication with the client device 102. In some implementations, the process 310 to 320 includes process 200, as described in reference to FIG. 2 above. The configuration process 310 may occur responsive to the measurement device 130 identifying the home network 110, which includes the gateway device 120 and at least one client device 102. The message or set of messages are received by the gateway device 120, which modifies information stored by the gateway device 120 according to one or more instructions indicated by the messages. The message or set of messages sent at 310 may include messages to initiate a DHCP or ARP configuration, as mentioned above. At 320, the measurement device establishes communication with the client device 102, such as, for example, by providing the client device 102 with a network address lease over DHCP. In some implementations, processes 310 and 320 occur simultaneously.

Upon configuring the home network 110 and establishing communication with the client device 102, the measurement device 130 receives network traffic sent by the client device 102 to the Internet 150, such as data packets sent by client device 102 at 330. Under this configuration, the measurement device 130 and client device 102 communicate with each other by way of gateway device 120, which receives the data packets sent by the client device 102, and routes them to measurement device 130 based on the network address to which the packets were sent.

At 340, the measurement device 130 monitors and logs the received network traffic, and forwards or "hairpins" the network traffic (e.g. data packets sent from client device 102 at 330) to the gateway device 120 at 350. The gateway 120 sends the received network traffic to an external network, such as the Internet 150, at 360.

Figure 4:
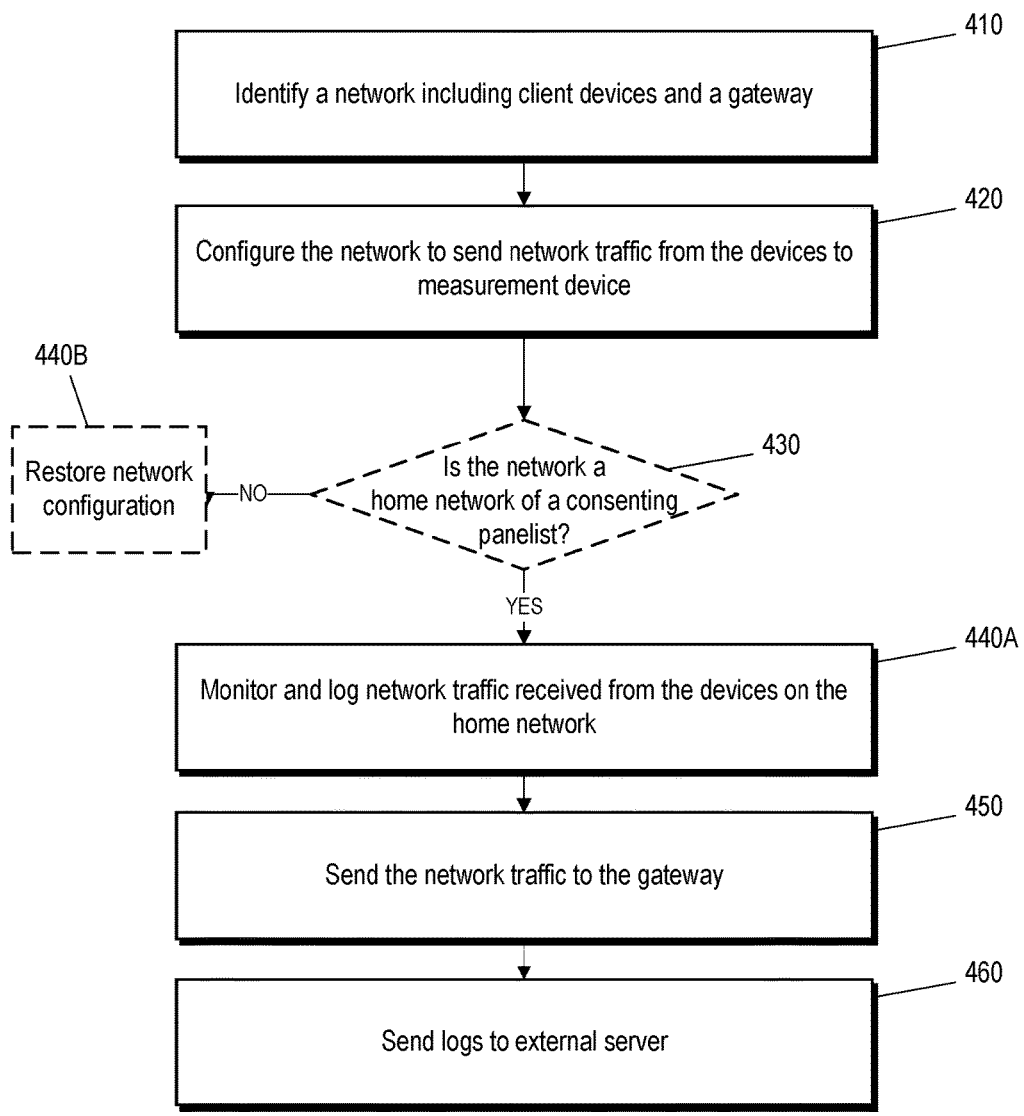
FIG. 4 is a flow chart illustrating an example of a process for configuring a home network to monitor network traffic.

FIG. 4 is a flow chart illustrating an example of a process 400 for configuring a home network to monitor network traffic. The following describes process 400 as being performed by the measurement device 130. However, the process 400 may be performed by other systems or system configurations.

The measurement device 130 identifies a network (e.g. home network 110) including client devices and a gateway device (410). In some cases, the home network includes a wireless network. The measurement device 130 configures the network to send network traffic from the client devices (e.g. devices 102A-D) to the measurement device 130 (420).

Once the network has been configured to send network traffic from the client devices to the measurement device 130, the measurement device 130 monitors and logs network traffic (e.g. data packets) received from the devices on the home network 110 (440A). After being monitored and logged, the network traffic is sent to the gateway device so that it may be sent to an external network, such as Internet 150 (450). At 470, the measurement device 130 may send the logged network traffic to an external server. For example, the measurement device 130 may be configured to periodically send the logs to the external server. In some implementations, the measurement device 130 may send the logs to the external server in response to determining that a threshold quantity of network traffic data has been logged. One or more external servers (not shown) may be accessible to the measurement device 130 over Internet 150 or home network 110, for example. In some implementations, the one or more external servers perform an analysis on the network traffic logs. Results of such an analysis may be provided to one or more of the user, an external party, and the measurement device 130.

In some implementations, the process 400 includes a determination about the network following its configuration by the measurement device 130 (430). In these implementations, the measurement device 130 determines whether the network identified and configured is a network, such as home network 110, that belongs to a consenting panelist.

The determination made at 430 may serve to ensure that the network is a home network of a consenting panelist by analyzing characteristics of the network, such as those exhibited by a group of devices on the network. In some implementations, the measurement device 130 may determine characteristics of the network to which it is connected, including characteristics of the devices connected to the network, and compare them with one or more predetermined characteristics. The measurement device 130 may evaluate results of these comparisons in order to determine whether the network that it is currently connected to is a home network of a consenting panelist. In the event that the measurement device 130 determines that the network that is currently connected to is not a home network of a consenting panelist, the measurement device may be configured to restore the network to an original configuration (440B). By ensuring that only home networks of consenting panelists are monitored, the measurement device 130 preserves network privacy.

The characteristics that the measurement device 130 may evaluate include a quantity of devices, types of devices, types of network traffic sent by the devices, usage patterns of the devices, quantity of devices with public IP addresses, Internet Service Provider (ISP), subnet masks of the devices, and combinations thereof. For instance, one or more of these characteristics may be compared to predetermined characteristics stored in the memory of the measurement device 130. In some implementations, the predetermined characteristics are threshold values. For example, the measurement device 130 may determine that the network to which it is connected is a home network of a consenting panelist if the quantity of devices on the network is less than a predetermined threshold value. On the other hand, the measurement device 130 may determine that the present network is not a home network if the quantity of devices exceeds this predetermined threshold value. This, for instance, may often be the case with a public network. In such case, the measurement device 130 may restore the configuration of the network and/or gateway device 120 at 440B so that the privacy of the present network is not compromised.

The predetermined characteristics may, for example, be set to values that allow the measurement device 130 to distinguish a home network from a public network. In some implementations, the predetermined characteristics may include a network fingerprint. In these implementations, the network fingerprint may include a collection of characteristics exhibited by the group of devices, including those described above, that are unique to a network. For instance, the measurement device 130 may include logic to learn what the network fingerprint for one or more home networks may look like based on characteristics extracted from network traffic. These learned network fingerprints may be stored by the measurement device 130 and later used as templates to which a network fingerprint of the network to which measurement device 130 is connected, may be compared. In this example, the measurement device 130 may determine that the present network is a home network of a consenting panelist if its network fingerprint matches the predetermined characteristics (e.g. one or more network fingerprint templates) with a predetermined degree of confidence. The measurement device 130 may use one or more statistical methods, such as linear regression and Hidden Markov Modeling methods, in order to learn network fingerprints for home network and perform the comparison (e.g. matching). In the event that the measurement device 130 determines that the network to which it is connected is not a home network of a consenting panelist, the privacy of the network and its users is maintained (440B).

Figure 5:
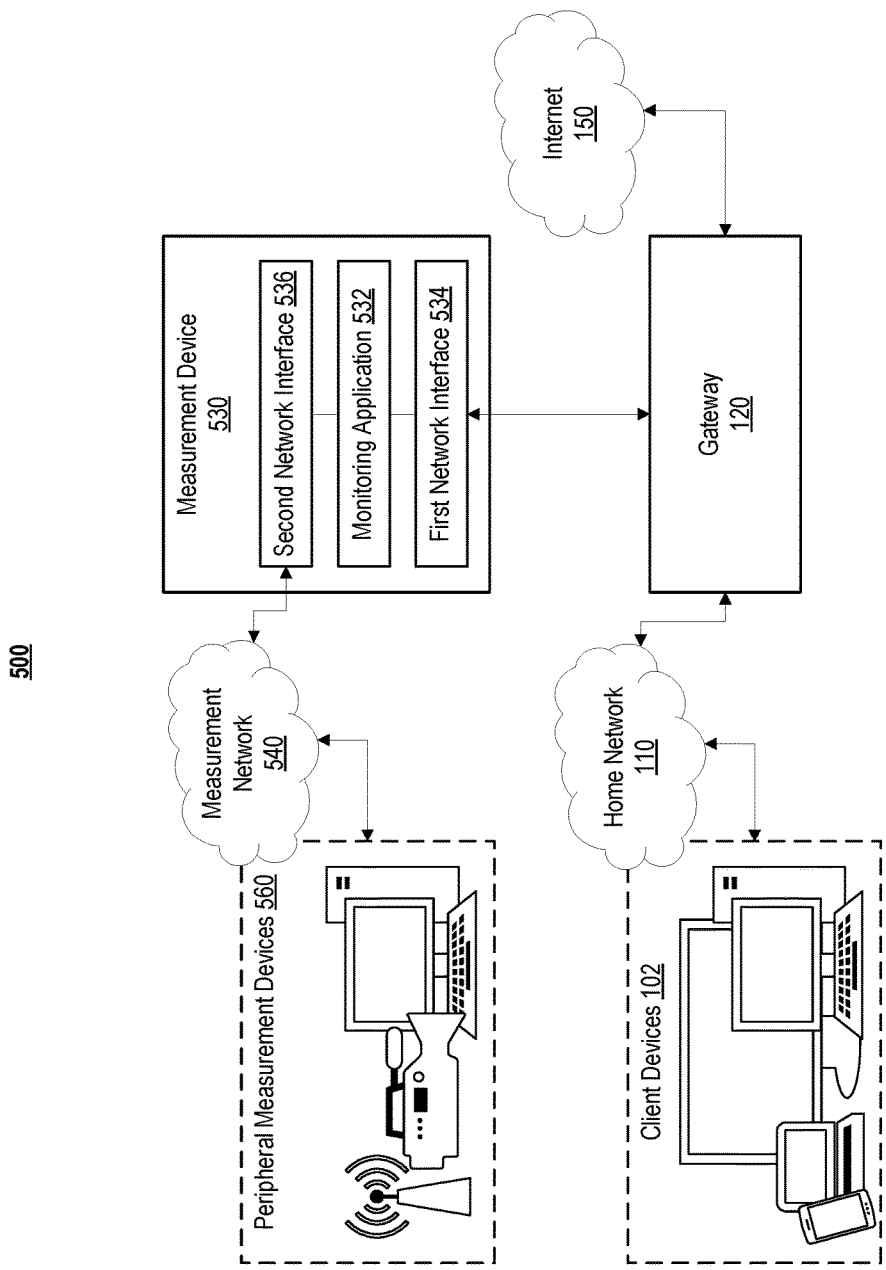
FIG. 5 illustrates an example of a system in which a measurement device communicates over a second network with other measurement peripheral devices.

FIG. 5 illustrates an example of a system 500 including a gateway device 120 and a measurement device 530. In some implementations, the measurement device 530 may be the measurement device from any of FIGS. 1-4. The measurement device 430 includes a first network interface 534 for providing communicative connection to the gateway device 120. Through this connection, the measurement device 530 may receive network traffic from client devices 102 over home network 110, as similarly described above. The measurement device 530 may then monitor the network traffic with monitoring application 532. Additionally, the measurement device 530 includes a second communication interface 536 for providing a communicative connection to another network. For instance, the second network interface 536 may enable the measurement device 530 to communicate with one or more devices on a second network distinct from home network 110. In some implementations, the second network interface 536 includes a network component for a power line communication network. In these implementations, the measurement device 530 may be able to provide the power line communication network to one or more devices connected to household electrical wiring. However, it is understood that the second network interface 536 may provide for other types of communication, such as Wi-Fi, Bluetooth, ZigBee, Near Field Communication, RFID, WiMAX, and CDMA communications.

In some implementations, the measurement device 130 provides other devices, such as peripheral measurement devices 560, with access to the other network by generating a power line network on household electrical wiring or another type of network. This means that the measurement device 130 may also provide a "plug-and-play" network to a panelist, which can serve to further interface with the home network, external network, and other parties. In a power line network implementations, the second network interface 536 may be integrated with other device components and share a communicative connection with one or more power supply elements of the measurement device 530. In this manner, the measurement device 530 may provide a power line network to household electrical wiring simply by being plugged into a household power outlet. In some implementations, plugging one or more power supply elements of the measurement device 630 into a household power outlet may already be an installation step for providing the measurement device 530 with power to perform its monitoring functions, as described above. In some implementations, the network to which the second network interface 536 provides connectivity includes a measurement network 540. In these implementations, the peripheral measurement devices 560 may include any of a variety of measurement devices distributed within a household capable of capturing input from within the household.

In some implementations, input captured by one or more of peripheral measurement devices 560 may include input originating from one or more client devices 102. For example, peripheral measurement devices 560 may include an acoustic monitoring device that monitors ambient acoustic energy (e.g., sound). Other peripheral devices can include video cameras, motion detectors, computing devices, repeaters, gateways, other measurement devices configured to function in a same manner as measurement device 530, and other devices for use in monitoring household conditions. In the example of the acoustic monitoring device, the acoustic monitoring device may monitor ambient acoustic energy including a sound of the user's doorbell or an oven timer. The acoustic monitoring device may also monitor ambient acoustic energy produced by a client device, including audio produced by a smart television, such as the smart television described above in connection to a home network. The input captured by the acoustic monitoring device may be processed according to one or more recognition processes to identify a program, movie, or commercial being shown on the smart television. For example, the acoustic monitoring device may capture a sample of sound information and generate an acoustic fingerprint for the captured information, such as, for example, based on a time-frequency graph of sound sample (e.g., a spectrogram). The acoustic monitoring device may then query a database mapping known fingerprints to different content items (e.g., programs, songs, etc.) to determine the content item represented by the sound information. This database may be stored on an external server accessible over the Internet or another network, or the acoustic monitoring device may store such a database locally. In some cases, the content item may be identified based on an acoustic watermark (e.g., an audio signature encoded in the sound information such as one or more human-imperceptible tones encoding an identifier for the content item). In some implementations, such recognition processes are performed at an external server.

In these implementations, sound information samples from the acoustic monitoring device can be sent to the measurement device 530 over network 540. The measurement device 530 may then rely upon the first network interface 534 to provide the sound information samples to gateway device 120 so that it may be delivered to an external server over a network such as Internet 150. The external server may then perform analysis data from one or more of the devices of networks 110 and 540. In some implementations network repeaters and extenders, such as Wi-Fi extenders, can be provided on network 540. By taking advantage of the communication capabilities provided by the second network interface 536, a user may be able to provide Internet access to a variety of devices and appliances distributed across a household. With the monitoring and networking capabilities provided, the measurement device 630 allows users to easily implement new home automation technologies into their household.

Figure 6:
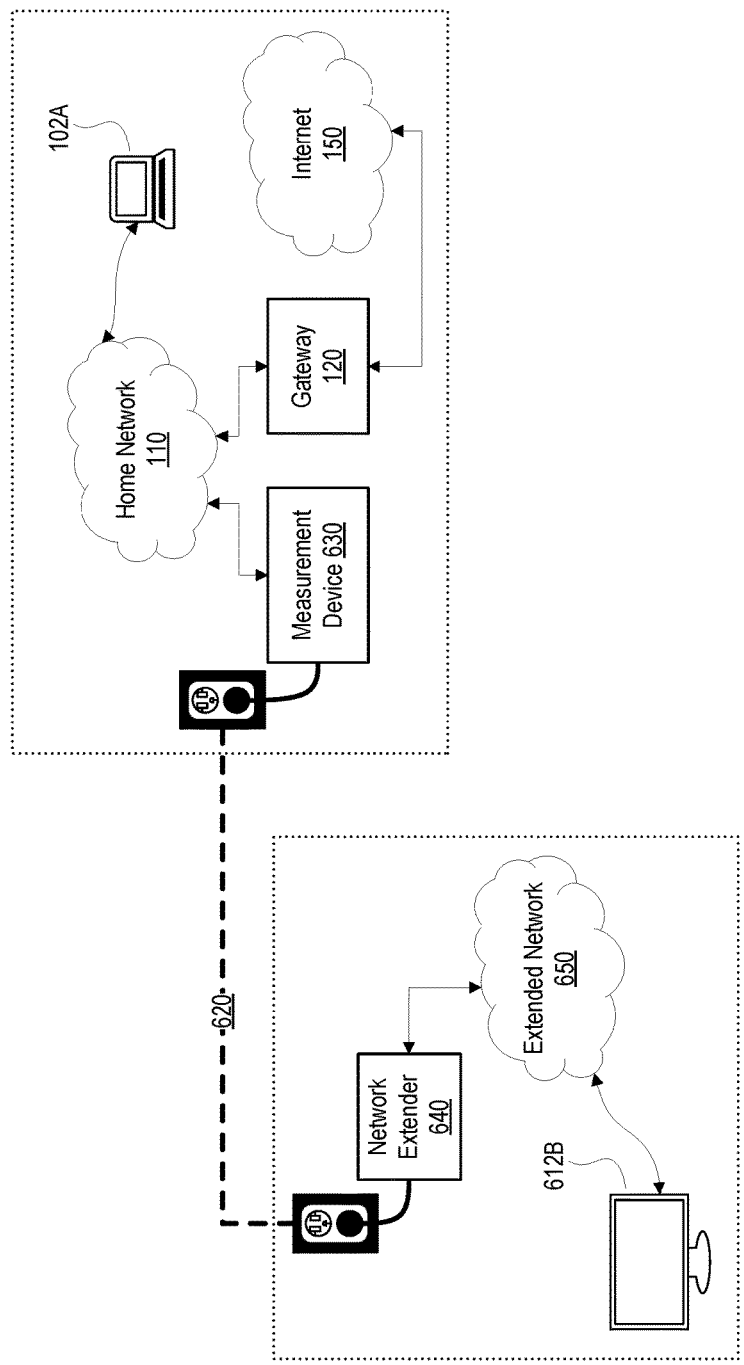
FIG. 6 illustrates another example of system in which a measurement device communicates over a second network with other measurement peripheral devices.

FIG. 6 illustrates another example of a system 600 in which a peripheral measurement device (network extender 640) communicates with a measurement device 630. The measurement device 630 may generate a power line communication network 620 to communicate with the network extender 640. Network extender 640 may provide an extended network 650 to which devices, such as device 612, may connect. The network extender 640 may communicate requests from devices on the extended network 650 to the home network 110 via the power line communication network 620, effectively extending the home network. In some cases, the extended network 650 may be a Wi-Fi network configured with the same SSID as the home network 110, and the network extender may include functionality to interact with the gateway device 120 to allow devices to migrate from the extended network 650 to the home network 110 while maintaining existing network connections. The network extender 640 may also capture network traffic from devices connected to the extended network 650, and transfer the captured traffic to the measurement device 630 for storage and later analysis. In some cases, the network extender 640 may include an acoustic collector operable to capture sound information. Such sound information may be used to identify content being consumed near the network extender 640, such as, for example, by identifying acoustic signatures of television programs in the captured sound information. The network extender 640 may transfer the captured sound information to the measurement device 630, or may process the sound information to identify the content it represents (e.g., a television show based on the acoustic signature) and transfer this identification to the measurement device 630.

With the configuration shown in FIG. 6, network extender 640 may receive its power and Internet access by simply being plugged into a household power outlet. That is, the second network interface 536 may enable a user (e.g. panelist) to generate, scale, advance, and integrate multiple networks for their devices and appliances. Accordingly, the user may obtain the benefit of an extended home network in exchange for installing the measurement device 630 and network extender 640 in the home and allowing their network traffic to be monitored. Although a network extender is described, any additional or alternative components may be provided to the user in exchange for installing the measurement device 630, including, for example, a set top box console that enables the user to access over-the-top video content programming (e.g., Netflix, YouTube, etc.), or a video game console.

Figure 7:
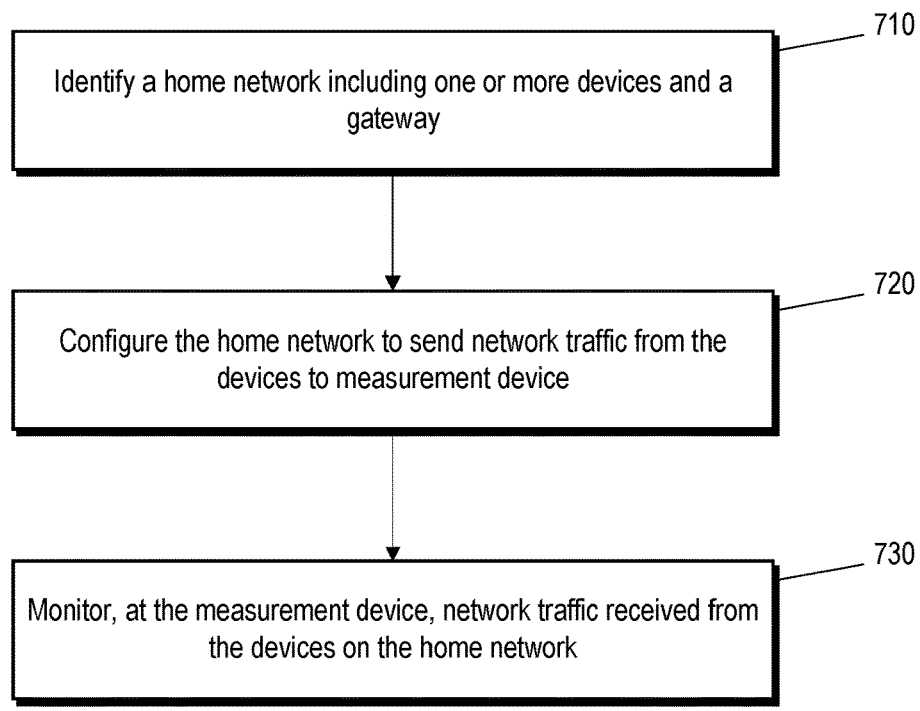
FIG. 7 is a flow chart illustrating an example of a process that may be performed to configure a network to monitor network traffic.

FIG. 7 is a flow chart illustrating an example process 700 of a process that may be performed to configure a home network. The following describes process 700 as being performed by the measurement device 130. However, the process 700 may be performed by other systems or system configurations.

The measurement device 130 identifies a network (e.g. home network 110) including client devices and a gateway device (710). In some cases, the home network includes a wireless network. The measurement device 130 configures the network to send network traffic from the client devices (e.g. devices 102A-D) to the measurement device 130 (720). In some cases, configuring the home network to send network traffic from the devices to the measurement component connected to the gateway includes relieving, by the measurement component, the gateway of a task of allocating network configuration parameters to the devices of the home network under dynamic host configuration protocol (DHCP). In some implementations, this includes sending dynamic host configuration protocol (DHCP) requests for network addresses to the gateway, determining that network address leases provided by the gateway are occupied based on the gateway not responding to one of the DHCP requests, and in response to determining that the that network address leases provided by the gateway are occupied, sending, by the measurement component, responses to DHCP requests from the device on the home network, the responses including a network address associated with the measurement component in a default gateway parameter. Configuring the home network to send network traffic from the devices to the measurement component connected to the gateway may include modifying an address resolution protocol (ARP) table managed by the gateway to designate a media access control (MAC) address of the measurement component as a destination for network traffic on the home network.

Once the network has been configured to send network traffic from the client devices to the measurement device 130, the measurement device 130 monitors network traffic (e.g. data packets) received from the devices on the home network 110 (730). In some cases, the monitoring includes receiving network traffic from the devices on the home network, and sending the network traffic to the gateway so that it may be sent to the external network.

In some cases, the measurement device 130 may log network traffic received from the devices on the home network; and send one or more network traffic logs to an external server.

The measurement device 130 may also receive data from at least one additional device other than the devices on the home network; and send the data from the at least one additional device to an external server. In some cases, the data may be received over a power line network.

Figure 8:
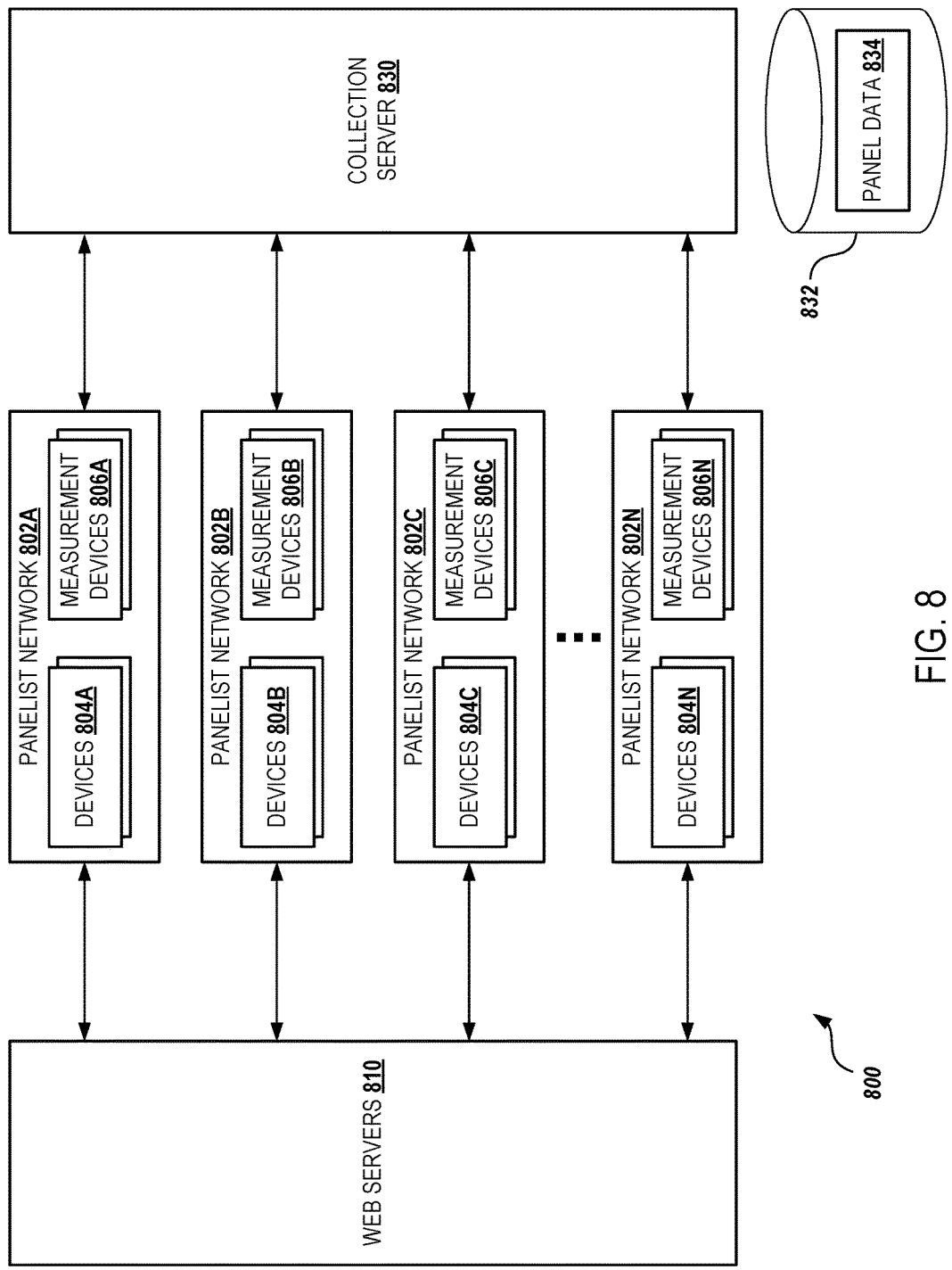
FIG. 8 illustrates an example of a system in which multiple panelist networks may be used to collect data for Internet audience measurement

FIG. 8 illustrates an example of a system 800 in which multiple panelist networks 802A-N may be used to collect data for Internet audience measurement. The panelist networks 802A-N may be systems configured as described relative to FIG. 1, with a measurement device connected to a gateway device monitoring network traffic on a home network.

The system 800 includes panelist networks 802A-N, one or more web servers 810, a collection server 830, and a database 832. In general, devices 804A-N on the respective panelist networks 802A-N access resources on the Internet, such as webpages located at the web servers 810. Information about this resource access is sent by measurement devices 806A-N to a collection server 830. This information may be used to understand the usage habits of users of the Internet. In some cases, the measurement devices 806A-N may include devices for monitoring other types of activity, such as the acoustic measurement device described relative to FIG. 5, or other devices.

Each of the measurement devices 806A-N, the collection server 830, and the web servers 810 may be implemented using, for example, a general-purpose computer capable of responding to and executing instructions in a defined manner, a personal computer, a special-purpose computer, a workstation, a server, or a mobile device. The measurement devices 806A-N, collection server 830, and web servers 810 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by measurement devices 806A-N, collection server 830, and web servers 810.

In the example shown in FIG. 8, the system 800 includes panelist networks 802A-N. However, in other implementations, there may be more or fewer panelist networks. Similarly, in the example shown in FIG. 8, there is a single collection server 830. However, in other implementations there may be more than one collection server 830. For example, each of the client systems 812, 814, 816, and 818 may send data to more than one collection server for redundancy. In other implementations, the panelist networks 802A-N may send data to different collection servers. In this implementation, the data, which represents data from the entire panel, may be communicated to and aggregated at a central location for later processing. The central location may be one of the collection servers.

The users of the panelist networks 802A-N are a group of users that are a representative sample of the larger universe being measured, such as the universe of all Internet users or all Internet users in a geographic region. To understand the overall behavior of the universe being measured, the behavior from this sample is projected to the universe being measured. The size of the universe being measured and/or the demographic composition of that universe may be obtained, for example, using independent measurements or studies. For example, enumeration studies may be conducted monthly (or at other intervals) using random digit dialing.

Similarly, the panelist networks 802A-N are a group of networks that are a representative sample of the larger universe of client systems being used to access resources on the Internet. As a result, the behavior on a machine basis, rather than person basis, can also be, additionally or alternatively, projected to the universe of all client systems accessing resources on the Internet. The total universe of such client systems may also be determined, for example, using independent measurements or studies.

The users in the panel (e.g., the individual owners of the panelist networks 802A-N) may be recruited by an entity controlling the collection server 830, and the entity may collect various demographic information regarding the users in the panel, such as age, sex, household size, household composition, geographic region, number of client systems, and household income. The techniques used to recruit users may be chosen or developed to help insure that a good random sample of the universe being measured is obtained, biases in the sample are minimized, and the highest manageable cooperation rates are achieved. Once a user is recruited, the user may be instructed to install a measurement device (e.g., 806A-N) on their home network. The measurement device collects the information about resources on the Internet accessed by devices on the user's network, and sends that information to the collection server 830.

The measurement device may monitor network traffic to analyze and collect information regarding requests for resources sent from the devices on the network and subsequent responses. For instance, the measurement device may analyze and collect information regarding HTTP requests and subsequent HTTP responses.

Thus, in system 800, a measurement device 806A-N, may be installed on each of the panelist networks 802A-N. Accordingly, when a device 804A-N on one of the panelist networks 802A-N visits and views web pages, information about these visits may be collected and sent to the collection server 830 by the measurement device 806A-N. For instance, the measurement device may collect and send to the collection server 830 the URLs of web pages or other resources accessed, the times those pages or resources were accessed, and an identifier associated with the particular panelist network on which the measurement device is installed (which may be associated with the demographic information collected regarding the user or users of that client system). For example, a unique identifier may be generated and associated with the particular measurement device installed on the panelist network. The measurement device also may collect and send information about the requests for resources and subsequent responses. The collection server 830 receives and records this information. The collection server 830 aggregates the recorded information from the panelist networks and stores this aggregated information in the database 832 as panel data 834.

The panel data 834 may be analyzed to determine the visitation or other habits of users in the panel, which may be extrapolated to the larger population of all Internet users. The information collected during a particular usage period (session) can be associated with a particular user of the panelist network (and/or his or her demographics) that is believed or known to be using the device from which the usage was detected during that time period. For example, the measurement device may require the user to identify his or herself, or techniques such as those described in U.S. Patent Application No. 2004-0019518 or U.S. Pat. No. 7,260,837, both incorporated herein by reference in their entirety, may be used. Identifying the individual using the devices may allow the usage information to be determined and extrapolated on a per person basis, rather than a per machine basis. In other words, doing so allows the measurements taken to be attributable to individuals across machines within households, rather than to the machines themselves.

To extrapolate the usage of the panel members to the larger universe being measured, some or all of the members of the panel are weighted and projected to the larger universe. In some implementations, a subset of all of the members of the panel may be weighted and projected. For instance, analysis of the received data may indicate that the data collected from some members of the panel may be unreliable. Those members may be excluded from reporting and, hence, from being weighted and projected.

The reporting sample of users (those included in the weighting and projection) are weighted to insure that the reporting sample reflects the demographic composition of the universe of users to be measured, and this weighted sample is projected to the universe of all users. This may be accomplished by determining a projection weight for each member of the reporting sample and applying that projection weight to the usage of that member. Similarly, a reporting sample of devices on panelist networks may be projected to the universe of all devices or users by applying projection weights to the usage of the panelist network. The panelist network projection weights are generally different from the user projection weights.

The usage behavior of the weighted and projected sample (either user or device) may then be considered a representative portrayal of the behavior of the defined universe (either user or device, respectively). Behavioral patterns observed in the weighted, projected sample may be assumed to reflect behavioral patterns in the universe.

Estimates of visitation or other behavior can be generated from this information. For example, this data may be used to estimate the number of unique visitors (or devices) visiting certain web pages or groups of web pages, or unique visitors within a particular demographic visiting certain web pages or groups of web pages. This data may also be used to determine other estimates, such as the frequency of usage per user (or device), average number of pages viewed per user (or client system), and average number of minutes spent per user (or device).

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components.

Accordingly, other implementations are within the scope of the following claims.

What is claimed is:

1. A computer-implemented method executed by one or more processors, the method comprising:
    identifying a home network including one or more devices and a gateway configured to receive network traffic from the devices and send the received network traffic to an external network;
    configuring the home network to send network traffic from the devices to a measurement device connected to the gateway;
    after configuring the home network, monitoring, at the measurement device, network traffic received from the devices on the home network;
    evaluating, at the measurement device, one or more characteristics of the home network, wherein the one or more characteristics comprise at least one of: a quantity of devices; types of devices; types of network traffic sent by devices; usage patterns of devices; a quantity of devices with public IP addresses; an Internet Service Provider; and subnet masks of devices;
    determining, based on the one or more characteristics of the home network, a network fingerprint of the home network;
    comparing, at the measurement device, the network fingerprint to stored network fingerprints to aid in determining the type of the home network that the home network comprises; and
    determining, based on the comparing, a type of the home network.

2. The computer-implemented method of claim 1, wherein configuring the home network includes relieving, by the measurement device, the gateway of a task of providing network configuration to the devices of the home network.

3. The computer-implemented method of claim 2, wherein relieving the gateway includes:
    sending, by the measurement device, dynamic host configuration protocol (DHCP) requests for network addresses to the gateway;
    determining that network address leases provided by the gateway are occupied based on the gateway not responding to one of the DHCP requests; and
    in response to determining that the network address leases provided by the gateway are occupied, sending, by the measurement device, responses to DHCP requests from the device on the home network, the responses including a network address associated with the measurement device in a default gateway parameter.

4. The computer-implemented method of claim 1, wherein configuring the home network includes modifying an address resolution protocol (ARP) table managed by the gateway to designate a media access control (MAC) address of the measurement device as a destination for network traffic on the home network.

5. The computer-implemented method of claim 1, wherein monitoring network traffic includes receiving network traffic from the devices on the home network, and sending the network traffic to the gateway for routing to the external network.

6. The computer-implemented method of claim 1, further comprising:
    storing, at the measurement device, network traffic received from the devices on the home network in a network traffic log; and
    sending the network traffic log to an external server.

7. The computer-implemented method of claim 1, further comprising:
    receiving, at the measurement device, measurement data from an additional measurement device over a measurement network different than the home network; and
    sending the measurement data to an external server.

8. The computer-implemented method of claim 7, wherein receiving, at the measurement device, data from the additional measurement device includes receiving the data over a power line network.

9. A non-transitory, computer-readable medium storing instructions operable when executed to cause at least one processor to perform operations comprising:
    identifying a home network including one or more devices and a gateway configured to receive network traffic from the devices and send the received network traffic to an external network;
    configuring the home network to send network traffic from the devices to a measurement device connected to the gateway;
    after configuring the home network, monitoring, at the measurement device, network traffic received from the devices on the home network;
    evaluating, at the measurement device, one or more characteristics of the home network, wherein the one or more characteristics comprise at least one of: a quantity of devices; types of devices; types of network traffic sent by devices; usage patterns of devices; a quantity of devices with public IP addresses; an Internet Service Provider; and subnet masks of devices;
    determining, based on the one or more characteristics of the home network, a network fingerprint of the home network;
    comparing, at the measurement device, the network fingerprint to stored network fingerprints to aid in determining the type of the home network that the home network comprises; and
    determining, based on the comparing, a type of the home network.

10. The computer-readable medium of claim 9, wherein configuring the home network includes relieving the gateway of a task of providing network configuration to the devices of the home network under dynamic host configuration protocol (DHCP).

11. The computer-readable medium of claim 9, wherein configuring the home network includes modifying an address resolution protocol (ARP) table managed by the gateway to designate a media access control (MAC) address of the measurement device as a destination for network traffic on the home network.

12. The computer-readable medium of claim 9, wherein monitoring the home network includes receiving network traffic from the devices on the home network, and sending the network traffic to the gateway so that it may be sent to the external network.

13. The computer-readable medium of claim 9, wherein the operations further comprise:
    logging, at the measurement device, network traffic received from the devices on the home network; and
    sending one or more network traffic logs to an external server.

14. The computer-readable medium of claim 9, wherein the operations further comprise:
    receiving, at the measurement device, data from at least one additional device other than the devices on the home network; and
    sending the data from the at least one additional device to an external server.

15. The computer-readable medium of claim 14, wherein receiving, at the measurement device, data from at least one additional device includes receiving the data over a power line network.

16. A system, comprising:
    memory for storing data;
    a home network including one or more devices;
    a gateway configured to receive network traffic from the devices and send the received network traffic to an external network; and
    a measurement device connected to gateway and including one or more processors operable to perform operations comprising:
        configuring the home network to send network traffic from the devices to the measurement device;
        after configuring the home network, monitoring network traffic received from the devices on the home network;
        evaluating one or more characteristics of the home network, wherein the one or more characteristics comprise at least one of: a quantity of devices; types of devices; types of network traffic sent by devices; usage patterns of devices; a quantity of devices with public IP addresses; an Internet Service Provider; and subnet masks of devices;
        determining, based on the one or more characteristics of the home network, a network fingerprint of the home network;
        comparing the network fingerprint to stored network fingerprints to aid in determining the type of the home network that the home network comprises; and
        determining, based on the comparing, a type of the home network.

17. The system of claim 16, wherein configuring the home network includes relieving, by the measurement device, the gateway of a task of allocating network configuration parameters to the devices of the home network under dynamic host configuration protocol (DHCP).

18. The system of claim 16, wherein configuring the home network includes modifying an address resolution protocol (ARP) table managed by the gateway to designate a media access control (MAC) address of the measurement device as a destination for network traffic on the home network.

19. The system of claim 16, wherein the monitoring includes receiving network traffic from the devices on the home network, and sending the network traffic to the gateway so that it may be sent to the external network.

20. The system of claim 16, the operations further comprising:
    logging network traffic received from the devices on the home network; and
    sending one or more network traffic logs to an external server.

21. The computer-implemented method of claim 1, wherein the type of the home network comprises at least one of: a public network; a private network; a network of a panelist;
    and a network of a non-panelist.

22. The computer-implemented method of claim 1, wherein the predetermined characteristics comprise threshold values such that the comparing the one or more characteristics to the predetermined characteristics comprises determining whether the one or more characteristics satisfy the threshold values.

23. The computer-implemented method of claim 1, wherein the network fingerprint is determined based on one or more statistical methods.

* * * * *